March 7, 1933.   W. MÖLLER   1,900,516
STEERING APPARATUS FOR AIRCRAFT
Filed June 18, 1931   2 Sheets-Sheet 1

Inventor:
Waldemar Möller
by Edward H. Palmer
Atty.

March 7, 1933.  W. MÖLLER  1,900,516
STEERING APPARATUS FOR AIRCRAFT
Filed June 18, 1931  2 Sheets-Sheet 2

Inventor:
Waldemar Möller
by Edward H. Palmer
Atty.

Patented Mar. 7, 1933

1,900,516

UNITED STATES PATENT OFFICE

WALDEMAR MÖLLER, OF BERLIN-CHARLOTTENBURG, GERMANY, ASSIGNOR TO ASKANIA-WERKE AKTIENGESELLSCHAFT, OF BERLIN-FRIEDENAU, GERMANY, A CORPORATION OF GERMANY

STEERING APPARATUS FOR AIRCRAFT

Application filed June 18, 1931, Serial No. 545,229, and in Great Britain July 1, 1930.

This invention relates to steering apparatus for aircraft.

The present invention has for its object among other things to improve the construction disclosed and claimed in United States Letters Patent No. 1,729,850 of Oct. 1, 1929, and more particularly in United States Letters Patent No. 1,795,694 of March 10, 1931.

The above-mentioned United States Letters Patent No. 1,729,850 has essentially for its object to provide steering mechanism for aircraft enabling the passenger to determine the direction of travel by rotating a compass casing with respect to the magnet system thereof so as to control a source of power which supplies the forces for operating the lateral steering device, more specifically the rudder. According to said patent the source of power is provided by pressure of one or more jets or streams of a fluid, preferably air, and which are controlled by the rotation imparted to the compass casing relatively to the magnet system thereof. The apparatus may be used for setting a direction indicator which informs the pilot in which direction he has to steer as well as for effecting the steering automatically.

In the above-mentioned Letters Patent No. 1,795,694, there is disclosed apparatus for effecting steering, and more particularly automatic steering of aircraft in which rotation of a compass casing relative to the magnet system of said compass brings into operation a force or system of forces to operate the lateral steering means, more specifically the rudder of the aircraft, means responsive to turning movements of the aircraft being provided tending to oppose the afore-mentioned force or system of forces. In said patent relative movement of the compass magnet system and casing causes a fluid pressure difference which acts upon one or more membranes or pistons causing deflection or movement thereof and this deflection or movement is communicated through suitable link and lever mechanism to a pivoted pressure fluid nozzle, the pressure fluid jet from which is divided more or less equally according to the position of said nozzle between passages communicating with the opposite sides of a piston of a servo-motor which controls the rudder or other lateral steering means. The means responsive to turning movement of the aircraft are connected to a suitable movable pivot in the link and lever mechanism.

The present invention comprises an improvement in the invention disclosed in said Patent No. 1,795,694 in accordance with which the membrane or membranes is/are connected directly or through a resilient connection only with the pivoted pressure fluid nozzle or other controlling member.

The means responsive to turning movement of the aircraft, such as a gyroscope or turn indicator is also preferably connected directly or through a resilient connection with said nozzle, and the connection and arrangement are such that the precessional movements of the gyroscope for example tend to oppose the action of the compass on the lateral steering means.

In accordance with the present invention means are also provided for returning the rudder to its central undeflected position at the completion of a turn.

Means are. also preferably provided for damping the precessional movements of the gyroscope or turn indicator, the reason for which will be described later.

Another improvement resides in the provision of means to counteract deviation from the true path of travel due to sideslip caused by lateral inclination of the aircraft.

Additional features of the present invention will be fully described in the course of this specification.

The invention and its aims and objects will be clearly understood from the following description, taken in connection with the accompanying drawings, of one embodiment of the invention herein given for illustrative purposes, the true scope of the invention being more fully pointed out in the appended claims.

In the following description only so much of the earlier construction will be described as appears essential to the understanding of the present invention, reference being made to said above-referred to earlier patents for a more detailed description of said earlier construction. It will be understood however that the present invention is not to be considered as necessarily limited to said earlier construction.

Figure 1:
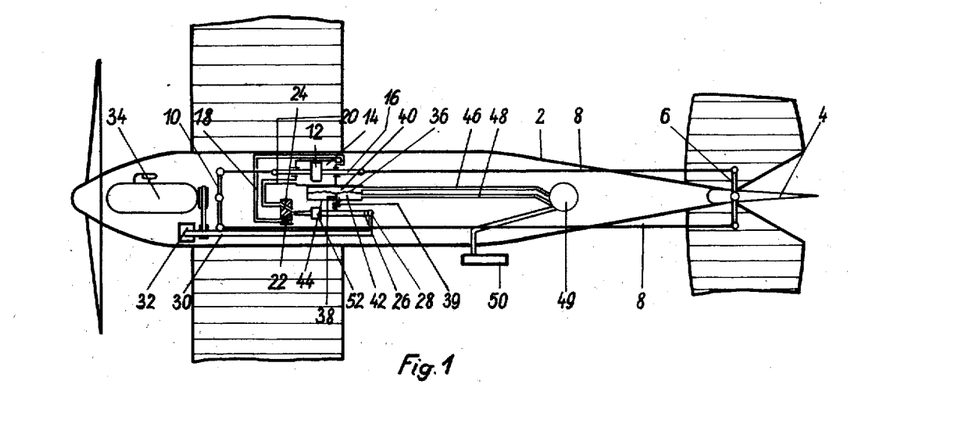
Fig. 1 is a diagrammatic top view of the fuselage of an airplane illustrating certain features of the invention in part diagrammatically.

The aircraft is steered on its course by lateral steering means, more specifically a vertical rudder 4, adjustment of said rudder being effected through lever 6, chain cables 8, and lever 10 forming part of suitable operating mechanism herein illustratively comprising a servo-motor consisting of a cylinder 14 in which works a piston 12 having its piston rod 16 connected to the chain cables 8. Pressure fluid, air, oil or the like, but preferably compressed air, is continuously supplied to both sides of the piston 12 through passages 18 and 20 communicating with ports 22 and 24 respectively, provided in a housing 23 located in front of the discharge opening of a nozzle 26, mounted to swing about the fulcrum 28 and from which there escapes a continuous jet of air under pressure. The air under pressure is continuously supplied to said nozzle through a conduit 30 by means of a blower 32 driven in any suitable manner by the aircraft engine 34. The nozzle 26 is connected to the center of a diaphragm 36 by a link 38, preferably with the interposition of a spring 39. The two chambers 40 and 42 into which the interior of the diaphragm casing 44 is divided by said diaphragm are supplied with air under pressure through conduits 46 and 48 from any suitable source, in the present case most conveniently by a Venturi tube 50 suitably located upon the aircraft so as to be exposed to the rush of air produced by the aircraft travel. The ratio between the quantities of air pressure supplied to said two chambers, that is to say the pressure differential between the pressures existing upon opposite sides of the diaphragm is determined by suitable means operated by variation of the relative position of the casing and magnet system of a compass 49. Said means may be similar to that described in said patents to which reference has been made.

So long as the aircraft follows the desired course and said course is not to be changed, so that the relative position of compass casing and magnet system remains unchanged, the chambers 40, 42 will each be supplied equally with compressed air, so that equal pressure is exerted upon opposite sides of the diaphragm 36, and the nozzle 26 is maintained with its discharge opening in median position relative to the two ports 22 and 24. Said two ports are thus equally supplied with compressed air, there is equal pressure upon opposite sides of the piston 12 and said piston and consequently rudder 4 remain at rest. If, however, the aircraft deviates from the old course, either by reason of outside disturbances or influences or because by rotation of the compass casing 24 relative to its magnet system by the pilot the course of the aircraft is changed, then, owing to said rotation of the compass casing relative to its magnet system, the pressure ratio or pressure differential in the conduits 46, 48 will be changed, higher pressure being thus exerted upon one side of the diaphragm 36 than upon the other. The diaphragm will therefore bulge to one side, the nozzle 26 will be displaced from its median position and one of the ports 22, 24 will receive more compressed air than the other. The pressure differential thus created upon opposite sides of the piston 12 will move said piston in the direction of lesser pressure. This movement, communicated to the rudder 4 through chain cables 8 and levers 6 and 10 will bring the aircraft back upon its old course or into the desired new course, as the case may be. This result will be obtained when the relative position of compass casing and magnet system is again such that the conduits 46 and 48 deliver the same amount of compressed air to opposite sides of the diaphragm 36, said diaphragm and the nozzle 26 then returning to their original positions.

So far as I am aware, in all automatic steering apparatus for aircraft heretofore constructed, no account has been taken of the influence resulting from the transverse inclination of the aircraft, although such influence may produce quite considerable deviations from the true or desired course of flight, and other disturbances. This influence results from the fact that upon each transverse inclination of an aircraft, that is to say, at each deviation of the upright axis from the total lateral acceleration (the component of gravity and lateral acceleration) said aircraft begins to side-slip. Pressure commensurate with the speed of the side-slip is thus brought to bear upon the lateral steering means, more specifically the vertical rudder and other steering surfaces; said pressure resulting in a turning movement of the aircraft which must be met by a greater or less adjustment of said lateral steering means.

In accordance with the present invention suitable means is provided to eliminate this source of error, resulting from the apparent transverse inclination of the aircraft. Preferably this is accomplished by subjecting the automatic steering apparatus to the action of an additional adjusting or corrective force, which is dependent on the apparent transverse inclination of the aircraft, that is to say on the position of lateral equilibrium of the aircraft with relation to the total lateral acceleration. Within the scope of the invention any suitable means may be used, but I have found suitable pendulous means to be the simplest solution and very satisfactory for the purpose. Said pendulous means will preferably comprise a weight suitably disposed and arranged to pendulate in response to lateral inclination of the aircraft. In the illustrative embodiment of the invention shown in Fig. 1 such a weight 52 is shown as conveniently affixed to the controlling member or nozzle 26.

If for any cause the aircraft be thrown out of its position of lateral equilibrium the nozzle 26 will pendulate under the action of the weight 52 and its opening will therefore be displaced from its median position relative to the two ports 22 and 24, that is to say it will be displaced from its position as determined by the other controlling forces, whereby the amount of compressed air supplied to ports 22 and 24 respectively, will be varied and an additional adjusting force, dependent on the lateral inclination of the aircraft, will be brought into action on the steering mechanism, herein the illustrative servo-motor 12—14 to act on the rudder 2. It will be apparent that by suitably determining the weight 52 and its pendulous position on the nozzle 26, this additional adjusting force can be so regulated that any deviation from the true course, due to side-slip upon apparent lateral inclination of the aircraft, will be corrected in exactly the same manner as a pilot would correct it were manual steering used. In order that this regulation may be surely and easily accomplished or improved said weight will preferably be adjustable longitudinally of the nozzle, which may be accomplished in any well known conventional manner.

In accordance with the invention said pendulous weight need not necessarily be secured to the nozzle itself, but any other suitable arrangement may be adopted which will enable said weight to exert its adjusting or corrective action on the rudder, preferably through the rudder operating mechanism.

As will be readily seen by reference to the above-referred to Patent No. 1,795,694, forces additional to those exerted on the nozzle, by the compass for example, may be caused to act upon said nozzle, which additional forces may emanate from means responsive to turning movement of the aircraft, said means comprising for example a precessing gyroscope having a precession axis parallel to its longitudinal axis, the object of said additional forces being to secure greater stability of steering free from disturbing pendulating motions.

Figure 2:
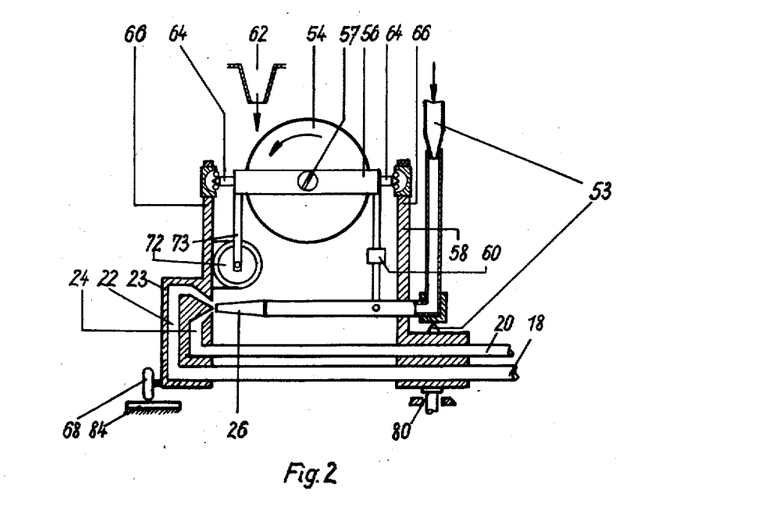
Fig. 2 is a lateral sectional elevation of an illustrative embodiment of the invention in which a controlling relay, specifically a pressure fluid nozzle, is additionally influenced by means, such as a gyroscope, responsive to turning movements of the aircraft about its upright axis, and in which the gyroscope frame carries an adjustable weight, ports 22 and 24 being shown rotated through 90° to bring them into the plane of the drawing for the sake of clearness.

If the automatic steering apparatus comprises such a stabilizing gyroscope, said gyroscope may serve to exert the correctional impulse or force dependent on the apparent lateral inclination of the aircraft. This may be accomplished in various ways without departing from the spirit of the invention; for example by locating the precessional axis of the gyroscope somewhat above the center of gravity of the gyroscope instead of causing it to pass through said center of gravity as is usually the case. I prefer, however, in this case also to use an adjustable weight as I have found that this arrangement makes possible a very fine adjustment of the additional force to be exerted by the weight, the weight being preferably adjustable. An illustrative convenient arrangement to this end is shown in Fig. 2, wherein the nozzle 26, mounted for swinging movement at 53, is acted upon by a gyroscope having its rotor 54 mounted in the gyroscope frame 56 which is connected to said nozzle by a link 58 with or without the interposition of a spring (not shown). The weight 60 is herein adjustably mounted upon the link 58. Upon apparent lateral inclination the weight 60 seeks to swing from its position and therefore to swing the nozzle 26 about its axis of rotation 53, thereby, through the connections already described, exerting the necessary correctional force on the rudder 4. An exact regulation may be secured by adjustment of the weight 60 longitudinally of the link 58.

Referring more particularly to Fig. 2, the gyroscope exerts as in the above referred to Patent No. 1,795,694 an additional force upon the nozzle 26. The gyroscope rotor 54 may be conveniently driven by an air current or jet from a nozzle 62 acting on blades (not shown) of usual construction on the periphery of said rotor. The gyroscope frame 56, in which the gyroscope spindle 57 is rotatably mounted, is in turn rotatably mounted for precession about an axis parallel to the longitudinal axis of the aircraft, that is to say about pivots 64 journalled in the frame 66. The frame 56, as in said patent, transmits its precessional movements, caused by turning movement of the aircraft about its vertical axis, to the nozzle 26 but through resilient means instead of through the more complex lever and link system of said patent. Said resilient means herein comprises springs 68 attached at one end to said nozzle and at their other ends to levers 70, 70 respectively, secured to the gyroscope frame 56 at opposite sides of said nozzle. By suitable adjustment of springs 68 and 39 relative to each other, the required adjustment or regulation of the compass action and of the counter action of the gyroscope upon the nozzle 26 will be secured, said gyroscope operating in such manner that by its action in opposition to the action of the compass on the rudder it will prevent curves or turning movements exceeding the limit of safety. On the other hand said gyroscope keeps the aircraft on a straight course in spite of other exterior disturbances causing slight pendulating motions.

The mode of operation is substantially the same as in said Patent No. 1,795,694, but the obnoxious lost motion due to the lever and link connections in said patent is avoided and the relative adjustment of the rudder and gyroscopic actions on each other is effected much more regularly and surely than was possible by the adjustment of the various lever fulcrums necessary for this purpose in said patent.

As the nozzle 26 need make only a relatively slight swinging movement in order to reach the limit of its swinging movement toward either side, that is to say, a position in which one of the ports 22, 24 will receive all of the compressed air or other fluid from said nozzle and the other none, so that further precession of the gyroscope would be without effect on the lateral steering means, the following objectionable results may occur in the case of undesired turning movements of the aircraft caused by heavy lateral gusts of wind for example.

It will be clear that the gyroscope is subjected to precessional force only so long as the turning movement of the aircraft continues, so that when, owing to the corrective action of the gyroscope on the lateral steering means, the turning movement ceases, the precessional forces acting on the gyroscope also cease. If the aircraft be now returned to its correct course by the corrective action of the rudder, the gyroscope will precess in the opposite direction, thus tending to keep the aircraft on its deflected or wrong course, until by the continued action of the compass the action of the gyroscope is overcome and the aircraft is very gradually returned to the correct course. By repeated gusts of wind in quick succession the aircraft may therefore be deflected further and further from its true course before it can be restored to the correct course by the compass after each gust. Thus the automatic steering apparatus may fulfill its function only too completely under conditions where repeated gusts of wind act in succession upon one side of the machine.

My invention contemplates the provision of means to prevent this objectionable feature. I preferably use for this purpose damping means or means for storing up the precessional energy. In the illustrative embodiment of the invention said damping means comprises a cylinder 72 (see Figs. 2 and 3) conveniently mounted at any suitable point, preferably on the frame 66 and in which works a piston 74 having its rod 76 pivotally connected to a rod 73 carried by the gyroscope frame 56. Adjacent the base of said cylinder there is provided a relatively minute opening 78 the size of which may be adjustable.

Figure 3:
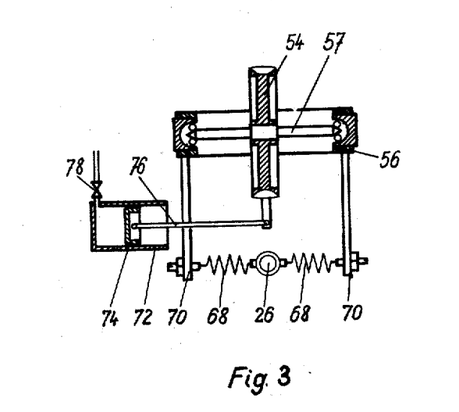
Fig. 3 shows an illustrative embodiment of damping or power storage means.

When the gyroscope frame 56 precesses about its axis, said frame must act through the piston 74 to draw into the cylinder 72 or expel therefrom through said opening a quantity of air commensurate with the extent of the precessional movement. The quantity of air drawn in or expelled is however, proportional to the product of the turning speed of the aircraft and the time required for such movement, since the precessional force is substantially proportional to the turning speed of the aircraft. The gyroscope therefore yields gradually to the precessional action during the entire turning movement until, at the conclusion of said turning movement it comes to rest with a maximum precessional movement dependent on the turning speed and the magnitude of the turning angle in which the rudder is swung into a corresponding position to effect corrective steering. When the turning movement caused by a gust of wind has come to an end on account of corrective action by the rudder, the piston must suck in again or force out, through said minute opening, exactly the same amount of air before the gyroscope can return to its zero position. The precessional energy of the gyroscope resulting from a more or less extended turn, and which would be lost once the nozzle has reached its extreme position, is therefore stored up by the cylinder arrangement described. When the turning movement has ceased, the gyroscope or the stored up energy thereof steers the aircraft back through the same angle as that through which it was deflected, without opposing the corrective action of the compass.

Figure 4:
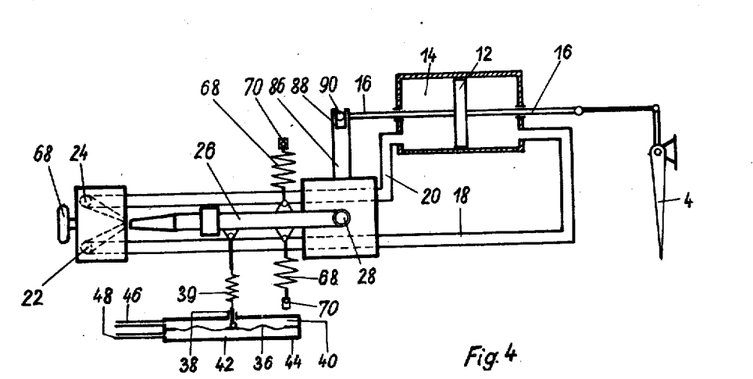
Fig. 4 is a top plan view showing the relation of the fluid pressure nozzle with the piston servo-motor and means for returning the rudder to its central undeflected position; also the manner in which the source of power released by the compass is caused to act upon the nozzle. To simplify the drawings the rudder is shown as directly connected to the piston rod 16.

In accordance with the present invention, the return movement of the diverted rudder is also effected without the use of links or levers. This is conveniently accomplished by making the frame 66 carrying the housing 33 containing the ports 22 and 24, rotatable about a stud shaft 80 in axial alignment with the axis 58 about which the nozzle 26 swings. Said frame 66 may be provided with a supporting roller 68 at its free end adapted to run upon a suitably curved rail 84. Connection with the rudder is conveniently effected by means of an arm 86 secured at one end to the frame 66 and having its other end forked at 88 to be engaged by a pin 90 carried by the piston rod 16 of the servo-motor or cylinder 14. It will be apparent that every movement of the piston 12 and consequently of the rudder resulting from a deviation of the nozzle 26 to one side or the other will correspondingly move the frame 66 through the connections above described with the result that the two ports 22 and 24 will tend to assume such a position of rest that the discharge opening of the nozzle 26 will be between them. Thus every position of the rudder corresponds to a definite position of the nozzle 26 and vice versa.

It will be apparent that within the scope of the invention the means responsive to lateral inclination of the aircraft, such as the weight herein described or other pendulating means could act on the automatic steering apparatus through separate mechanism, a separate relay for example, in which case the regulation or adjustment could be effected by varying the action of the relay on the servo-motor.

I am aware that the invention may be embodied in other specific forms without departing from the spirit or essential attributes thereof; and I therefore desire the present embodiment to be considered in all respects as illustrative and not restrictive, reference being had to the appended claims rather than to the foregoing description to indicate the scope of the invention.

I claim:

1. Steering apparatus for aircraft comprising, in combination, lateral steering means; pressure fluid driven operating mechanism therfor comprising a cylinder, a pistion in said cylinder, passages communicating with said cylinder on opposite sides of said piston respectively, and a nozzle to supply pressure fluid to said passages; pressure fluid operated mechanism to move said nozzle relatively to said passages to supply pressure fluid to said passages in varying ratio, and comprising a diaphragm chamber having a diaphragm connected by a resilient connection to said nozzle, and passages communicating with said diaphragm chamber at opposite sides respectively of said diaphragm; a compass having a relatively movable magnet system and casing; and means, controlled by relative movement of the magnet system and casing, to direct the pressure fluid in varying ratio into said last-named passages.

2. Steering apparatus for aircraft comprising, in combination, lateral steering means; pressure fluid driven operating mechanism therefor comprising a cylinder, a piston in said cylinder, passages communicating with said cylinder at opposite sides of said piston respectively, and a nozzle to supply pressure fluid to said passages; pressure fluid operated mechanism to move said nozzle relatively to said passages to supply pressure fluid to said passages in varying ratio and comprising a diaphragm chamber having a diaphragm connected by a resilient connection to said nozzle, and passages communicating with said diaphragn chamber at opposite sides respectively of said diaphragm; a compass having a relatively movable magnet system and casing; means controlled by relative movement of the magnet system and casing to direct the pressure fluid in varying ratio into said last-named passages; a gyroscope mounted in a frame for precession about its axis responsive to turning movement of the aircraft about its vertical axis; and a resilient connection between said gyroscope frame and said nozzle, the precessional movements of said gyroscope acting on said nozzle through said resilient connection so as to tend to oppose the compass-controlled action of said diaphragm on said nozzle.

3. Steering apparatus for aircraft comprising, in combination, lateral steering means; operating mechanism therefor; controlling means, comprising a resilient connection, for controlling the operation of said operating mechanism; and actuating means to actuate said controlling means for operating said lateral steering means.

4. Steering apparatus for aircraft comprising, in combination, lateral steering means; operating mechanism therefor; controlling means for controlling the operation of said operating mechanism; actuating means to actuate said controlling means to operate said lateral steering means; and means, responsive to turning movement of the aircraft about its vertical axis tending to actuate said controlling means in opposition to the action of said first-named actuating means, said means responsive to turning movement of the aircraft having a resilient connection with said controlling means.

5. Steering apparatus for aircraft comprising, in combination, lateral steering means; operating mechanism therefor; means to bring into operation a force to actuate said operating mechanism; and means, comprising a resilient connection and responsive to turning movement of the aircraft about its vertical axis, to bring into operation a force tending to oppose the action of said first-named force.

6. Steering apparatus for aircraft comprising, in combination, lateral steering means; operating mechanism therefor; compass-governed controlling means acting on said operating mechanism through a resilient connection to steer the aircraft; a gyroscope mounted in a frame for precession about its axis responsive to turning movement of the aircraft about its vertical axis; and resilient connection between said gyroscope frame and said controlling means, the precessional movements of said gyroscope acting on said controlling means through said resilient connection so as to tend to oppose the action of said compass on said controlling means.

7. Steering apparatus for aircraft comprising, in combination, lateral steering means; operating mechanism therefor; a compass comprising a relatively moveable magnet system and casing to actuate said operating mechanism to steer the aircraft; a gyroscope mounted in a frame for precession about its axis responsive to turning movement of the aircraft about its vertical axis, to act upon said operating mechanism in opposition to the action thereon of said compass; and damping means for damping the precessional movements of said gyroscope, said damping means comprising a piston connected to said gyroscope frame and working in a cylinder, means being provided to allow slow passage of air into and out of said cylinder.

8. Steering apparatus for aircraft comprising, in combination, lateral steering means; operating mechanism therefor; a compass, comprising a relatively movable magnet system and casing, to actuate and operating mechanism to steer the aircraft; a gyroscope mounted in a frame for precession about its axis responsive to turning movement of the aircraft about its vertical axis, to act upon said steering means operating mechanism in opposition to the action thereon of said compass; and damping means for damping the precessional movements of said gyroscope.

9. Steering apparatus for aircraft comprising, in combination, lateral steering means; a steering servo-motor for actuating said lateral steering means; a source of power to furnish power to actuate said servo-motor; a relay to control said source of power; means responsive to lateral turning movement of the aircraft and operatively connected to said relay to operate said relay to actuate said servo-motor; and operated by gravity means, operatively connected to said relay and responsive to turning movement of the aircraft about its longitudinal axis to operate said relay to actuate said servo-motor.

10. Steering apparatus for aircraft comprising, in combination, lateral steering means; a steering servo-motor operated by pressure fluid for actuating said lateral steering means; a movable nozzle to supply pressure fluid to said servo-motor to actuate the same; means responsive to lateral turning movement of the aircraft and operatively connected to said nozzle to move the same for actuaing said servo-motor; and operated by gravity means operatively connected to said nozzle and responsive to turning movement of the aircraft about its longitudinal axis, to move said nozzle to actuate said servo-motor.

11. Steering apparatus for aircraft comprising, in combination, lateral steering means; a steering servo-motor for actuating said lateral steering means; a source of power to actuate said servo-motor; a relay to control said source of power; a gyroscope operatively connected to said relay to move the same to actuate said servo-motor upon precession of said gyroscope due to turning movement of the aircraft about its vertical axis; and means connected to said gyroscope and to said relay and operated by gravity responsive to turning movement of the aircraft about its longitudinal axis, to operate said relay to actuate said servo-motor.

12. Steering apparatus for aircraft comprising, in combination, lateral steering means; operating mechanism therefor; a compass comprising a relatively movable casing and magnet system; means actuated responsive to relative movement of said casing and magnet system to actuate said operating mechanism; and means actuated by gravity responsive to lateral inclination of the aircraft to actuate said operating mechanism.

13. Steering apparatus for aircraft comprising, in combination, lateral steering means; operating mechanism therefor; means responsive to turning movement of the aircraft about its vertical axis to render said operating mechanism operative; and means operated by gravity responsive to turning movement of said aircraft about its longitudinal axis to render said operating mechanism operative.

14. Steering apparatus for aircraft comprising, in combination, lateral steering means; operating mechanism therefor; means responsive to the turning movement of the aircraft about its vertical axis to render said operating mechanism operative; and pendulous means responsive to turning movement of said aircraft about its longitudinal axis to render said operating mechanism operative.

15. Steering apparatus for aircraft, comprising in combination, lateral steering means; mechanism to operate said lateral steering means, said mechanism including a resilient connection; and means including a resilient connection tending to oppose the operation of said lateral steering means by said operating mechanism.

16. Steering apparatus for aircraft, comprising in combination, lateral steering means; mechanism to operate said lateral steering means, said mechanism including a resilient connection; m .s, including a resilient connection, tending to oppose the operation of said lateral steering means by said operating mechanism; and means relatively to adjust the tension of said resilient connections.

17. Steering apparatus for aircraft, comprising in combination, lateral steering means; operating mechanism therefor; and means, comprising a resilient connection, automatically to actuate said operating mechanism responsive to turning movement of the aircraft about a vertical axis.

In testimony whereof, I have signed my name to this specification.

WALDEMAR MÖLLER.

CERTIFICATE OF CORRECTION.

Patent No. 1,900,516.

March 7, 1933.

WALDEMAR MÖLLER.

It is hereby certified that error appears in the printed specification of the above numbered patent requiring correction as follows: Page 6, line 48, claim 8, for "and" second occurrence read "said"; lines 67 and 68, claim 9, strike out the words "operated by gravity" and insert the same before "responsive" in line 69; line 82, claim 10, for "actuaing" read "actuating", and line 83, same claim, strike out the words "operated by gravity" and insert the same before "responsive" in line 84; and that the said Letters Patent should be read with these corrections therein that the same may conform to the record of the case in the Patent Office.

Signed and sealed this 23rd day of May, A. D. 1933.

M. J. Moore.

Acting Commissioner of Patents.

(Seal)

movement of said aircraft about its longitudinal axis to render said operating mechanism operative.

15. Steering apparatus for aircraft, comprising in combination, lateral steering means; mechanism to operate said lateral steering means, said mechanism including a resilient connection; and means including a resilient connection tending to oppose the operation of said lateral steering means by said operating mechanism.

16. Steering apparatus for aircraft, comprising in combination, lateral steering means; mechanism to operate said lateral steering means, said mechanism including a resilient connection; m .s, including a resilient connection, tending to oppose the operation of said lateral steering means by said operating mechanism; and means relatively to adjust the tension of said resilient connections.

17. Steering apparatus for aircraft, comprising in combination, lateral steering means; operating mechanism therefor; and means, comprising a resilient connection, automatically to actuate said operating mechanism responsive to turning movement of the aircraft about a vertical axis.

In testimony whereof, I have signed my name to this specification.

WALDEMAR MÖLLER.

CERTIFICATE OF CORRECTION.

Patent No. 1,900,516.

March 7, 1933.

WALDEMAR MÖLLER.

It is hereby certified that error appears in the printed specification of the above numbered patent requiring correction as follows: Page 6, line 48, claim 8, for "and" second occurrence read "said"; lines 67 and 68, claim 9, strike out the words "operated by gravity" and insert the same before "responsive" in line 69; line 82, claim 10, for "actuaing" read "actuating", and line 83, same claim, strike out the words "operated by gravity" and insert the same before "responsive" in line 84; and that the said Letters Patent should be read with these corrections therein that the same may conform to the record of the case in the Patent Office.

Signed and sealed this 23rd day of May, A. D. 1933.

M. J. Moore.
Acting Commissioner of Patents.

(Seal)

CERTIFICATE OF CORRECTION.

Patent No. 1,900,516.  March 7, 1933.

WALDEMAR MÖLLER.

It is hereby certified that error appears in the printed specification of the above numbered patent requiring correction as follows: Page 6, line 48, claim 8, for "and" second occurrence read "said"; lines 67 and 68, claim 9, strike out the words "operated by gravity" and insert the same before "responsive" in line 69; line 82, claim 10, for "actuaing" read "actuating", and line 83, same claim, strike out the words "operated by gravity" and insert the same before "responsive" in line 84; and that the said Letters Patent should be read with these corrections therein that the same may conform to the record of the case in the Patent Office.

Signed and sealed this 23rd day of May, A. D. 1933.

M. J. Moore.
Acting Commissioner of Patents.

(Seal)